United States Patent
O'Rourke

(10) Patent No.: US 11,013,164 B1
(45) Date of Patent: May 25, 2021

(54) INDEX-BASED PLANTING CONSISTENCY TRACKING

(71) Applicant: Precision Planting LLC, Tremont, IL (US)

(72) Inventor: Brendan John O'Rourke, Pekin, IL (US)

(73) Assignee: Precision Planting LLC, Tremont, IL (US)

( * ) Notice: Subject to any disclaimer, the term of this patent is extended or adjusted under 35 U.S.C. 154(b) by 261 days.

(21) Appl. No.: 16/288,909

(22) Filed: Feb. 28, 2019

Related U.S. Application Data

(60) Provisional application No. 62/636,218, filed on Feb. 28, 2018.

(51) Int. Cl.
 *A01C 7/10* (2006.01)
 *A01C 7/18* (2006.01)
 *A01C 7/04* (2006.01)

(52) U.S. Cl.
 CPC .............. *A01C 7/105* (2013.01); *A01C 7/044* (2013.01); *A01C 7/18* (2013.01)

(58) Field of Classification Search
 CPC ........... A01C 7/105; A01C 7/044; A01C 7/18; A01C 7/102; A01C 7/10; A01C 7/08; A01C 7/00; A01C 7/042; A01C 7/04
 See application file for complete search history.

(56) References Cited

U.S. PATENT DOCUMENTS

| | | | |
|---|---|---|---|
| 7,086,269 B2 | 8/2006 | Sauder et al. |
| 8,078,367 B2 | 12/2011 | Sauder et al. |
| 9,332,689 B2 | 5/2016 | Baurer et al. |
| 9,481,294 B2 | 11/2016 | Sauder et al. |
| 9,961,825 B2 | 5/2018 | Allgaier et al. |
| 9,999,175 B2 | 6/2018 | Baurer et al. |
| 2012/0004768 A1 | 1/2012 | Schweitzer et al. |

*Primary Examiner* — Christopher J. Novosad

(57) ABSTRACT

A system, method, and device for displaying spacing information of discharged seeds. A seed disc may be configured to rotate at a disc velocity to discharge seeds. A seed sensor may be configured to generate a first signal indicative of a discharge time of a seed. A drive module may be operably coupled to the seed disc and may be configured to generate a second signal indicative of the disc velocity of the seed disc. A discharge time for the discharged seeds may be determined based on the first signal and/or the disc velocity of the seed disc may be determined based on the second signal. A seed disc index may be determined for discharged seeds based on the disc velocity of the seed disc and the discharge time for the seed. Spacing information may be determined for the seeds by comparing the determined seed disc indexes.

27 Claims, 13 Drawing Sheets

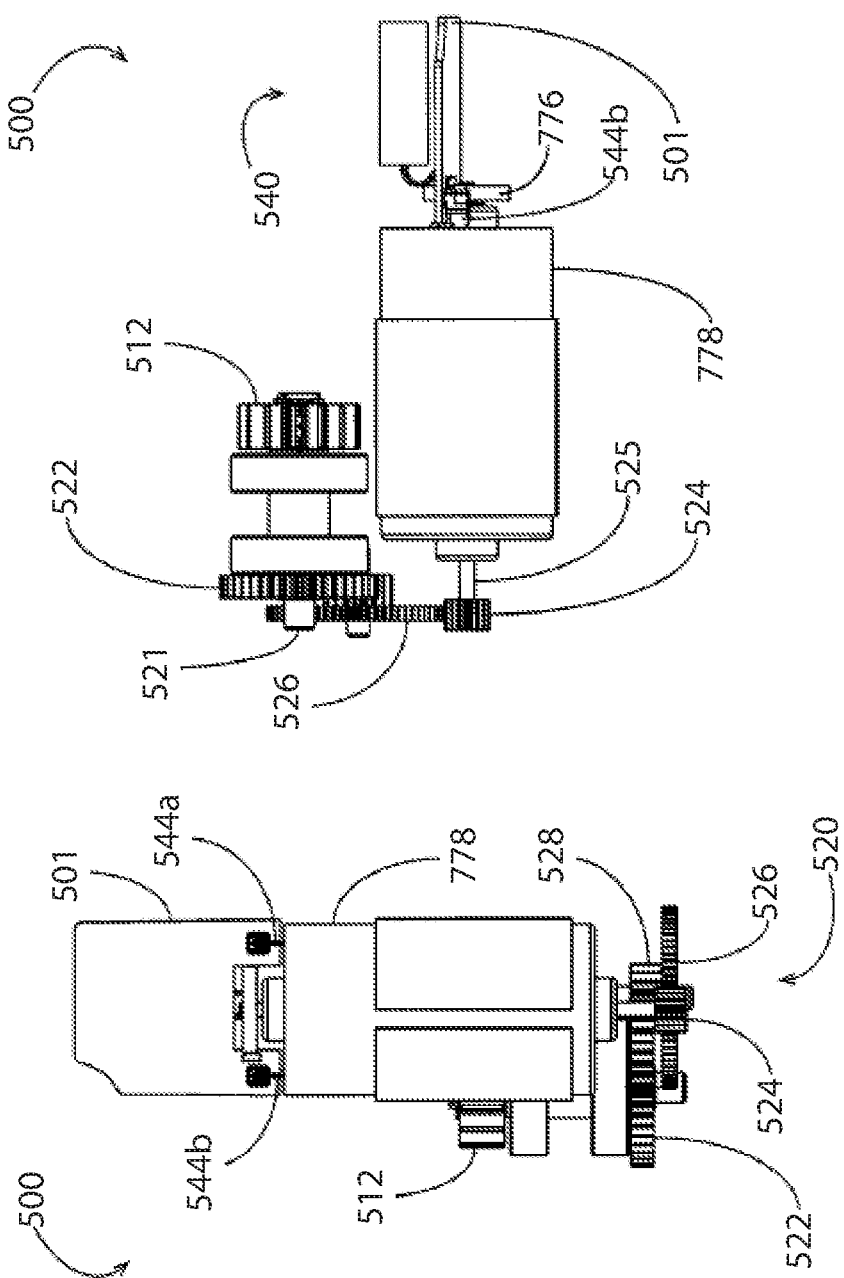

INDEX-BASED PLANTING CONSISTENCY TRACKING

CROSS-REFERENCE TO RELATED APPLICATIONS

This application claims priority to provisional application No. 62/636,218 filed Feb. 28, 2018.

BACKGROUND

Millions of acres are planted by growers in the United States annually, resulting in billions of dollars of annual revenues. Growers recognize that one of the most influential and controllable factors affecting the productivity of an acre planted is the quality of seed placement. If a grower can be provided with more information about seed placement quality while planting, the grower will be able to make corrections or adjustments to the planter or its operation which could increase production. The net gain to growers and the United States economy from such production increases could amount to hundreds of millions of dollars annually. Accordingly, there is a need for a monitor system and method that is capable of providing the operator with near real-time data concerning yield robbing events (such as the economic cost associated with such yield robbing events) so as to motivate the operator to take prompt corrective action.

BRIEF SUMMARY

A system, method, and device for displaying spacing information of discharged seeds is provided. For example, a seed disc may be configured to rotate at a disc velocity to discharge seeds. A seed sensor may be configured to generate a first signal indicative of a discharge time of a seed. A drive module may be operably coupled to the seed disc and may be configured to generate a second signal indicative of the disc velocity of the seed disc. A discharge time for the discharged seeds may be determined based on the first signal and/or the disc velocity of the seed disc may be determined based on the second signal. A seed disc index may be determined for discharged seeds based on the disc velocity of the seed disc and the discharge time for the seed. Spacing information may be determined for the seeds by comparing the determined seed disc indexes.

In an aspect, the seeds are discharged during a time duration that may be divided into time periods of a predetermined duration. One or more (e.g., each) seeds may have a relevant time period during which the seed was discharged. The disc index (e.g., for each seed) may be based on a difference between the discharge time and a time at which the relevant time period for the seed began. The disc velocity may be a velocity determined during the relevant time period, for example, for a (e.g., each) determination of the seed disc index.

In an aspect, spacing information may be determined based on differences between the determined seed disc index for one or more (e.g., each) seed. The spacing information may be indicative of whether the seeds are moderately misplaced from one another or severely misplaced from one another. A plant population of an area may be based on the spacing information of the seeds.

In an aspect, the seed disc index (e.g., for each seed) may be determined by multiplying the disc velocity determined during the relevant time period by the difference between the discharge time and the time at which the relevant time period for the seed began. The seed disc index (e.g., for each seed) may be based on a seed disc index determined at the time at which the relevant time period for the seed began.

DESCRIPTION OF THE DRAWINGS

FIG. 9A is a bottom view of the example drive module of FIG. 7A with covers and a housing removed.

FIG. 9B is a side elevation view of the example drive module of FIG. 7A with covers and a housing removed.

DETAILED DESCRIPTION

Figure 1:
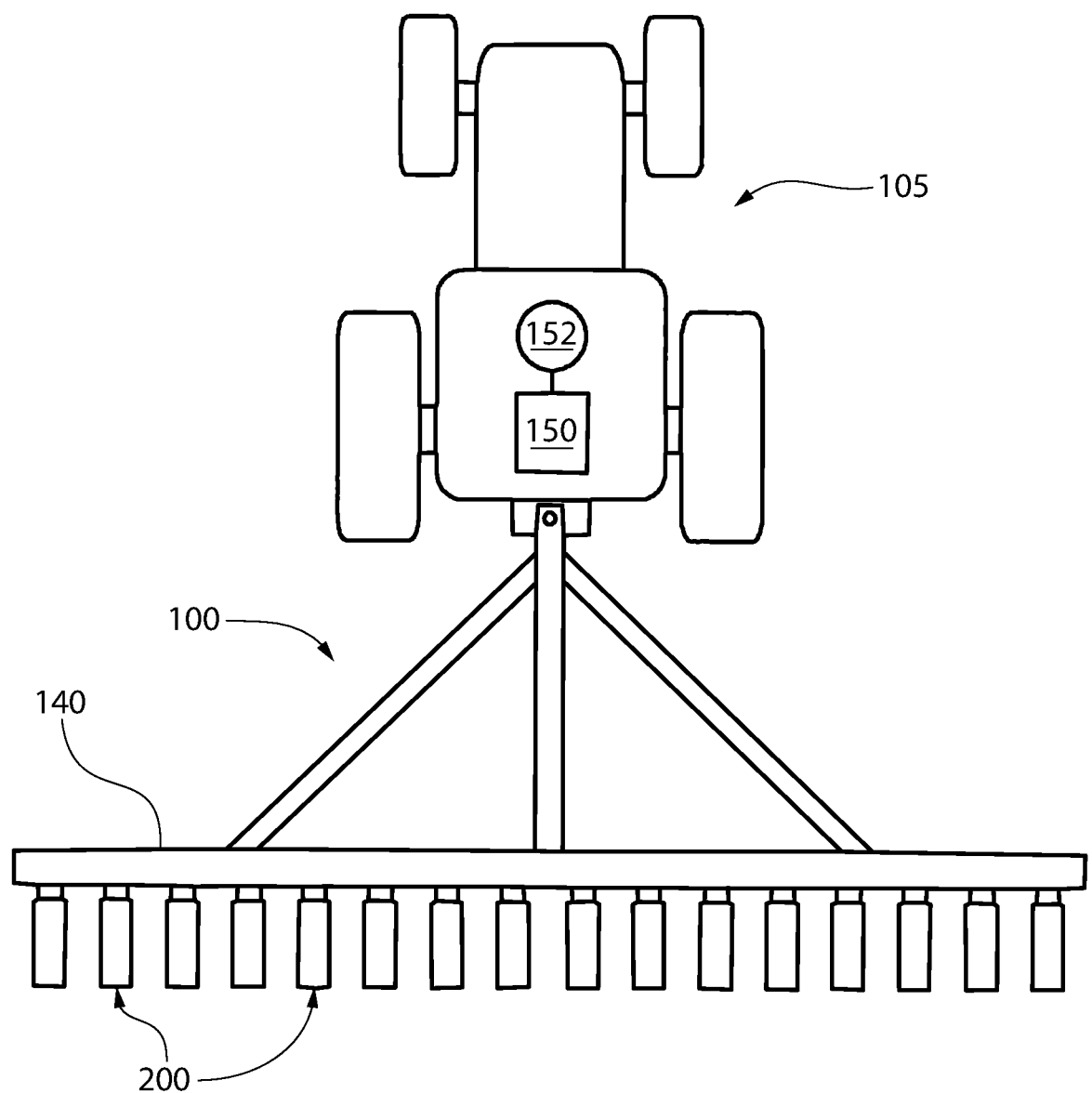
FIG. 1 is a top view of an example agricultural planter.

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present invention. The discussion herein describes and illustrates some possible non-limiting combinations of features that may exist alone or in other combinations of features. Furthermore, as used herein, the term "or" is to be interpreted as a logical operator that results in true whenever one or more of its operands are true. Furthermore, as used herein, the phrase "based on" is to be interpreted as meaning "based at least in part on," and therefore is not limited to an interpretation of "based entirely on."

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Features of the present invention may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present invention may be embodied in the form of computer-implemented processes and apparatuses such as processor-based data processing and communication systems or computer systems for practicing those processes. The present invention may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

As described herein, a planter (such as example planter 100, shown on FIG. 1) may include a monitor for providing information regarding planting events. For example, a monitor may warn a planter operator about "yield-robbing events." "Yield-robbing events" may be caused by one or more types of errors, such as metering errors and placement errors. Metering errors may occur when, instead of seeds being discharged one at a time, multiple seeds are discharged from the meter simultaneously (sometimes referred to as "multiplies" or "doubles"), or when no seed is discharged from the meter when a seed should have been discharged (typically referred to as a "skip"). Seed multiples and seed skips may result in a net loss in yield when compared to seeds planted with proper spacing, for example, because closely spaced plants may produce smaller ears due to competition for water and nutrients. Seed skips may result in a net loss in yield even though adjacent plants may produce larger ears as a result of less competition for water and nutrients due to the missing plant.

Placement errors may occur when the travel time between sequentially released seeds is irregular or inconsistent as compared to the time interval when the seeds were discharged from the seed meter. Placement errors may result in irregular spacing between adjacent seeds in the furrow. Placement errors may result from seed ricochet within the seed tube caused by the seed not entering the seed tube at the proper location, or by irregularities or obstructions along the path of the seed within the seed tube. Placement errors may alternatively, or additionally, result from excessive vertical accelerations of the row unit as the planter traverses the field.

Beyond metering errors and placement errors, other yield robbing events may be attributable to inappropriate soil compaction adjacent to the seed, which may be due to inadequate down pressure exerted by the gauge wheels on the surrounding soil or excessive down pressure exerted by the gauge wheels. For example, if too little downforce is exerted by the gauge wheels or other depth regulating member, the disk blades may not penetrate into the soil to the full desired depth and/or the soil may collapse into the furrow as the seeds are being deposited resulting in irregular seed depth. Alternatively, if excessive downward force is applied, poor root penetration may result in weaker stands which may place the crops under unnecessary stress during dry conditions. Excessive downforce may also result in the re-opening of the furrow affecting germination or causing seedling death.

As described further herein, a planter (e.g., planter 100) may be provided that includes an electronic device (e.g., processing circuitry) for determining spacing information between one or more seeds discharged for planting. The spacing information may be provided to a user of the planter, for example, via a monitor or other notification device. Such spacing information may be used to determine whether placement and/or metering errors are occurring, for example. Upon the determination and/or display of a placement and/or metering error, a user of a planter may take remediation actions so that seeds are discharged with the desired seed spacing and/or placement.

Referring now to the drawings, wherein like reference numerals designate identical or corresponding parts throughout the several views, FIG. 1 illustrates an example tractor 105 drawing an agricultural implement, e.g., a planter 100. The planter 100 may comprise a toolbar 140 operatively supporting multiple row units 200. Tractor may include a monitor 150 and/or a global positioning system ("GPS") receiver 152, for example, located in the cab of the tractor 100 or mounted to the tractor 100. Monitor 150 may include a central processing unit ("CPU"), memory, and/or graphical user interface ("GUI") (e.g., a touch-screen interface).

Figure 2:
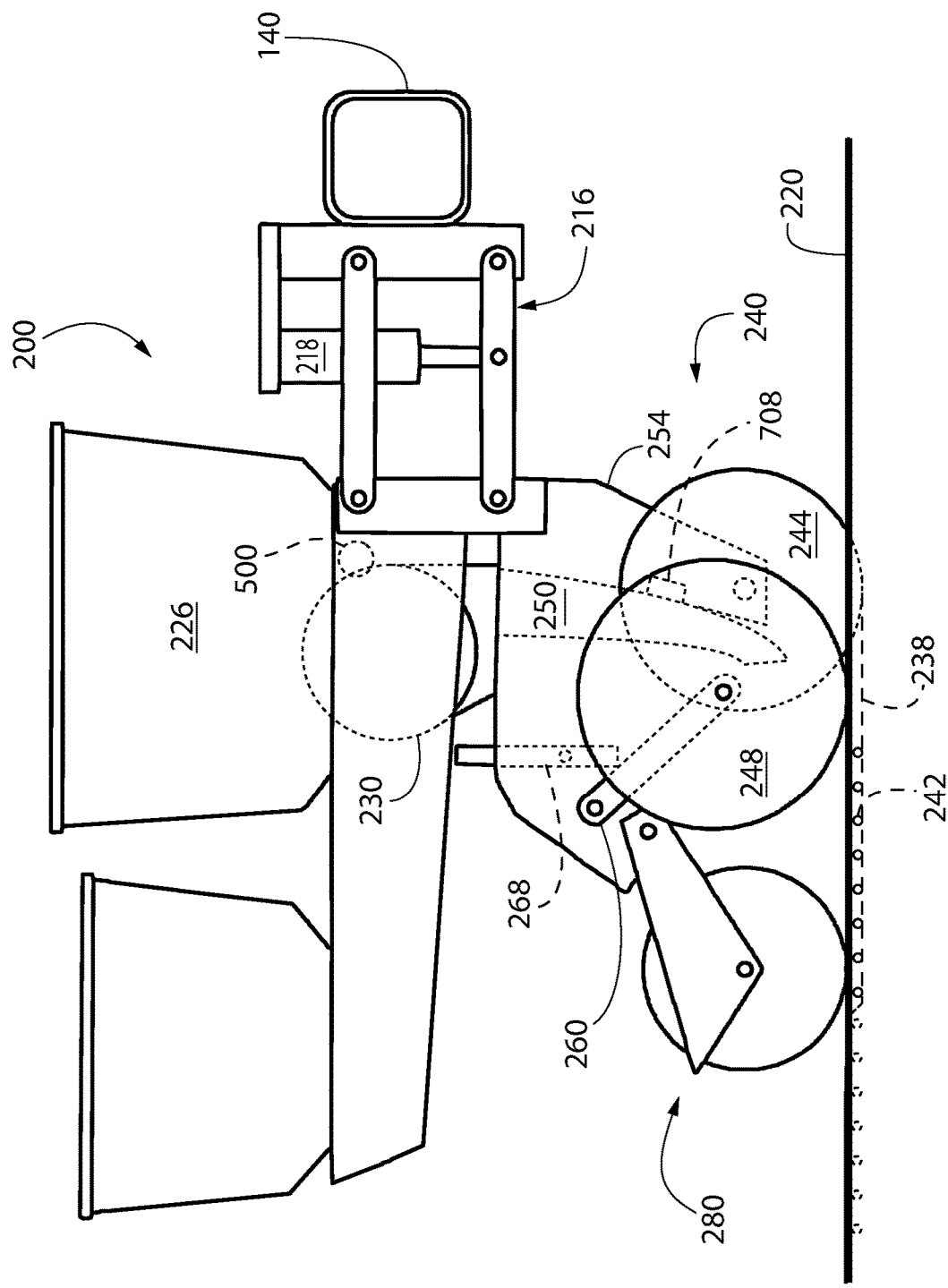
FIG. 2 is a side view of an example planter row unit.

FIG. 2 shows a side view of an example row unit 200 (e.g., planter row unit). The row unit 200 may be pivotally connected to the toolbar 140 by a parallel linkage 216. An actuator 218 may be disposed to apply lift and/or downforce on the row unit 200. An opening system 240 may include one or more (e.g., two) opening discs 244 that may be rollingly mounted to a downwardly-extending shank 254 and/or disposed to open a v-shaped trench 238 in the soil 220. One or more (e.g., a pair) of gauge wheels 248 may be pivotally supported by a pair of corresponding gauge wheel arms 260. The height of the gauge wheels 248 relative to the opener discs 244 may set the depth of the trench 238. A depth adjustment rocker 268 may limit the upward travel of the gauge wheel arms 260 and/or the upward travel of the gauge wheels 248.

A seed meter 230, such as that disclosed in Applicant's U.S. patent application Ser. No. 15/653,500 (the disclosure of which is incorporated herein by reference in its entirety), may be disposed to deposit seeds 242 from a hopper 226 into the trench 238, e.g., through a seed tube 250 disposed to guide the seeds toward the trench. The seed meter 230 may be driven by an electric drive 500, as described further herein. For example, the seed meter 230 may be driven by electric drive 500, which may be configured to drive a seed disc within the seed meter.

A seed sensor 708 (also shown on FIG. 4) may be mounted to the seed tube 250. Seed sensor 708 may be an optical or electromagnetic seed sensor configured to generate a signal indicating passage of a seed (e.g., a discharged seed). For example, the seed sensor 708 may be disposed to send light or electromagnetic waves across the path of seeds 242. A closing system 280 (e.g., including one or more closing wheels) may be pivotally coupled to the row unit 200 and configured to close the trench 238.

Figure 3:
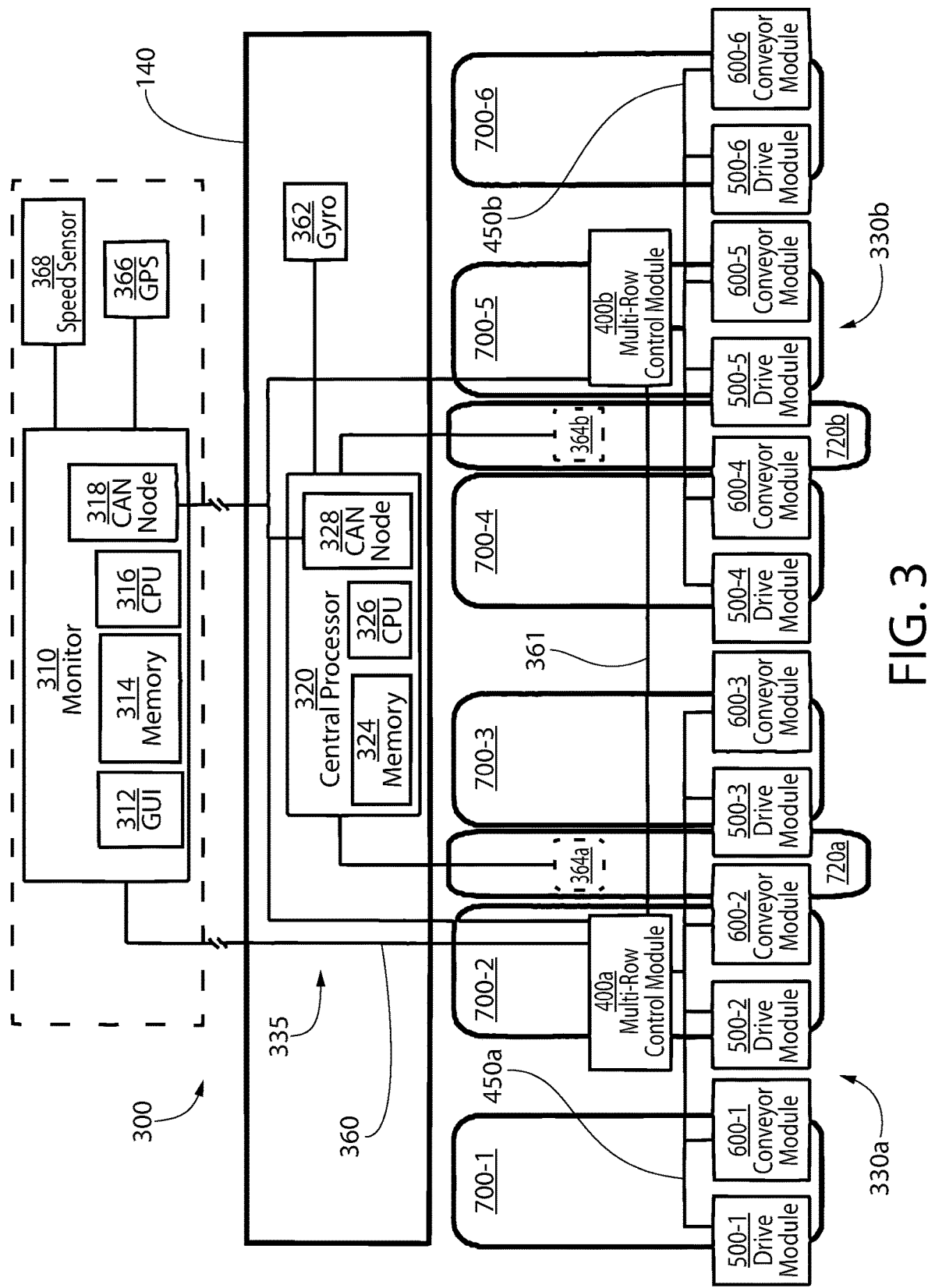
FIG. 3 schematically illustrates an embodiment of an electrical control system for controlling and monitoring an agricultural implement having a plurality of rows.

FIG. 3 schematically illustrates an agricultural implement (e.g., planter 100 comprising a toolbar 140 (FIG. 1)) operatively supporting six row units 700. The toolbar 140 may be supported by left and right implement wheels 720a, 720b and drawn by a tractor 105 (FIG. 1). A control system 300 may include a monitor 310 that may be mounted to (e.g., in) the tractor 105, an implement network 335, and/or two row networks 330a, 330b. The control system 300 may be of the type described in Applicant's U.S. Pat. No. 9,999,175, the disclosure of which is incorporated herein in its entirety by reference.

The monitor 310 may include a graphical user interface ("GUI") 312, a memory 314, a central processing unit ("CPU") 316, and a bus node 318. The bus node 318 may comprise a controller area network ("CAN") node including a CAN transceiver, a controller, and/or a processor. The monitor 310 may be in electrical communication with a speed sensor 368 (e.g., a radar speed sensor mounted to the tractor 105) and a global positioning receiver ("GPS") receiver 366 mounted to the tractor 105. In examples the monitor 310 may be in electrical communication with the toolbar 140.

The implement network 335 may include an implement bus 350 and/or a central processor 320. The central processor 320 may be mounted to the toolbar 140. The bus described herein may be a CAN bus included within a harness which may connect a (e.g., each) module on the bus to power, ground, and bus signal lines (e.g., CAN-Hi and CAN-Lo).

The central processor 320 may include a memory 324, a CPU 326, and/or a bus node 328 (e.g., a CAN node including a CAN transceiver, a controller, and a processor). The implement bus 350 may comprise a CAN bus. The monitor 310 may be in electrical communication with the implement bus 350. The central processor 320 may be in electrical communication with wheel speed sensors 364a, 364b (e.g., Hall-effect speed sensors) mounted to the left and right implement wheels 720a, 720b, respectively. The central processor 320 may be in electrical communication with a gyroscope 362 that may be mounted to the toolbar 140.

A (e.g., each) row network 330 may include a multi-row control module 400 mounted to one or more of the row units 700, a row bus 450, drive modules 500 (e.g., three drive modules 500) mounted to three row units 700, and three conveyor modules 600 mounted to three row units 700 respectively. A (e.g., each) row unit 700 having at least a drive module 500 in a particular row unit network 330 may be described herein as being "within" that row network.

Figure 4:
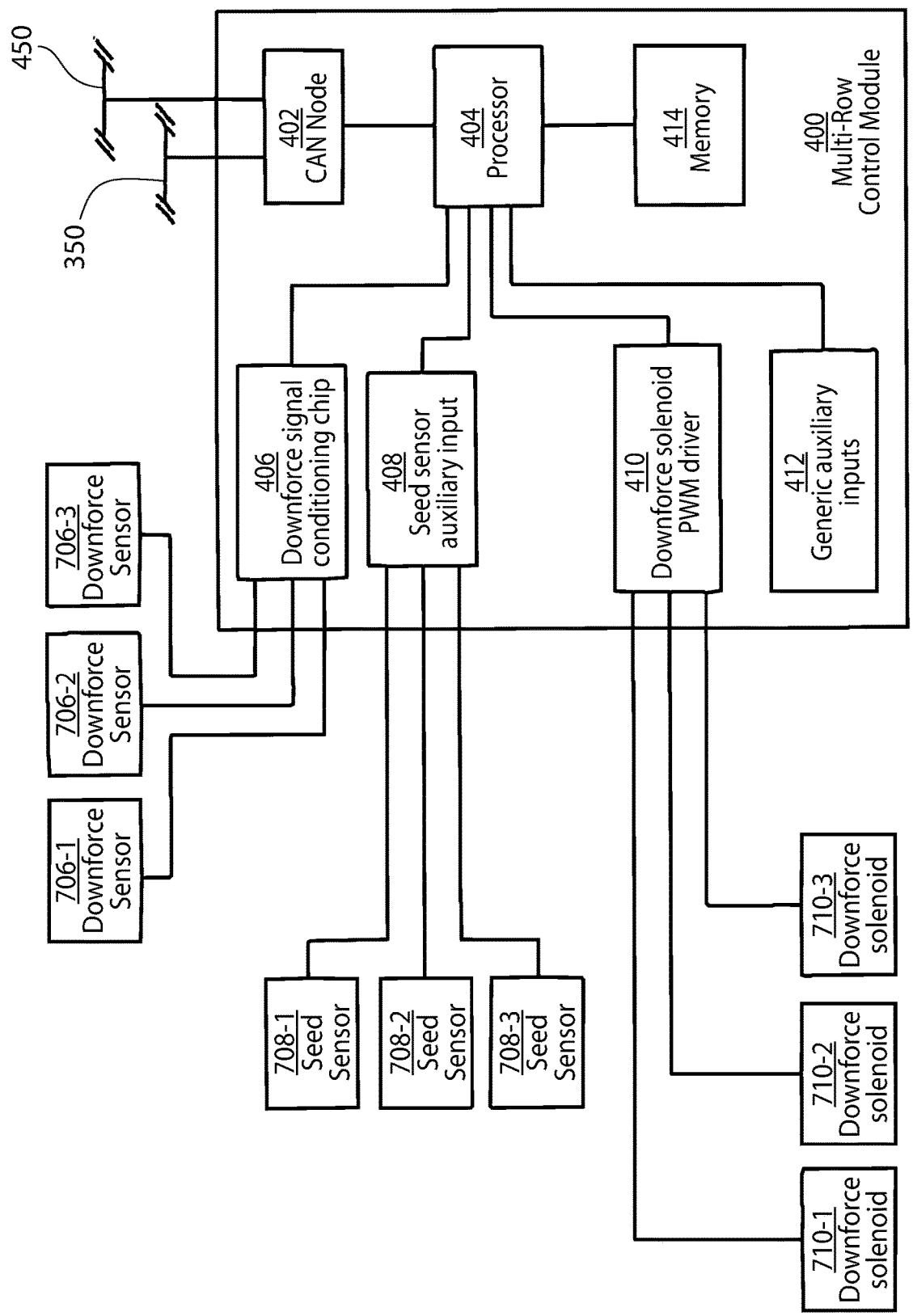
FIG. 4 schematically illustrates an example multi-row control module.

FIG. 4 shows an example multi-row control module 400. Multi-row control module 400 may include a bus node 402 (e.g., a CAN node including a CAN transceiver, a controller, and a processor). The CAN node (e.g., the CAN transceiver) may be in electrical communication with the row bus 450 and/or the implement bus 350. The multi-row control module 400 may include a memory 414 and a processor 404 in electrical communication with a downforce signal conditioning chip 406, a seed sensor auxiliary input 408, a downforce solenoid pulse-width modulation ("PWM") driver 410, and/or auxiliary inputs 412. The auxiliary inputs 412 may be configured for electrical communication with sensors including a pressure sensor and a lift switch. The downforce signal conditioning chip 406 may be in electrical communication with a downforce sensor 706 on a (e.g., each) row unit 700 within the implement network 335. The downforce solenoid PWM driver 410 may be in electrical communication with a downforce solenoid 710 on a (e.g., each) row unit within the row network 330. In examples including a seed tube, the seed sensor auxiliary input 408 may be in electrical communication with a seed sensor 708 (e.g., an optical sensor) on a (e.g., each) row unit 700 within the row network 330.

Figure 5:
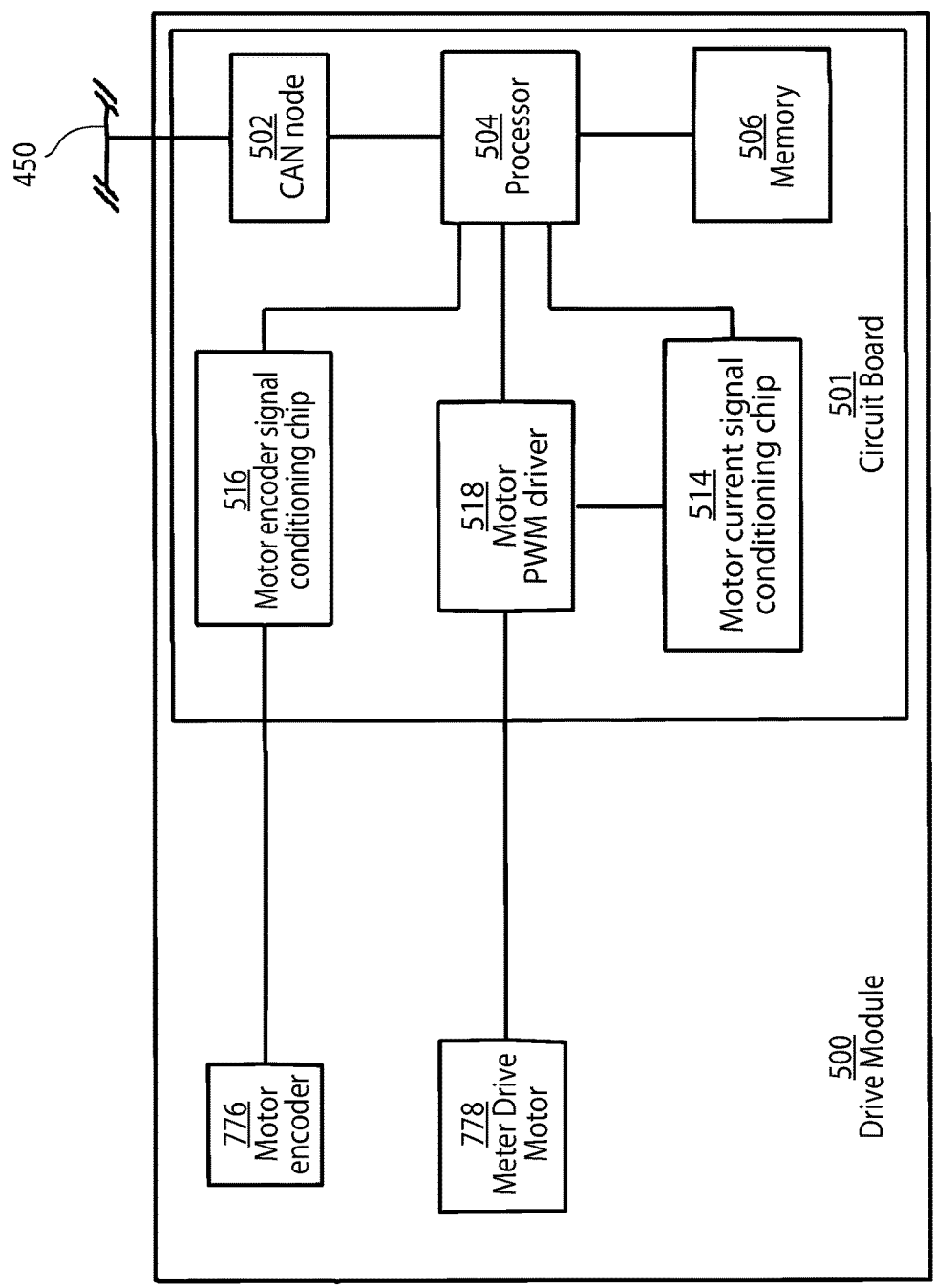
FIG. 5 schematically illustrates an example drive module.

FIG. 5 shows an example drive module 500. Drive module 500 may include circuit board 501, a motor encoder 776, and/or a meter drive motor 778. The circuit board 501 may include a bus node 502 (e.g., a CAN node including a CAN transceiver, a controller, and a processor). The CAN node (e.g., the CAN transceiver) may be in electrical communication with the row bus 450. The drive module 500 may include a memory 506 and a processor 504 in electrical communication with a motor encoder signal conditioning chip 516, a motor PWM driver 518, and/or a motor current signal conditioning chip 514. The motor PWM driver 518 may be in electrical communication with a motor 778 for controlling an output speed of the motor 778. The motor encoder signal conditioning chip 516 may be in electrical communication with the motor encoder 776, which may be configured to generate a signal indicative of driving speed of the motor 770, e.g., by generating a defined number of encoder pulses per motor shaft rotation. The motor current signal conditioning chip 514 may be in electrical communication with the motor PWM driver 518 for sampling the actual current driving the motor 778.

Figure 6:
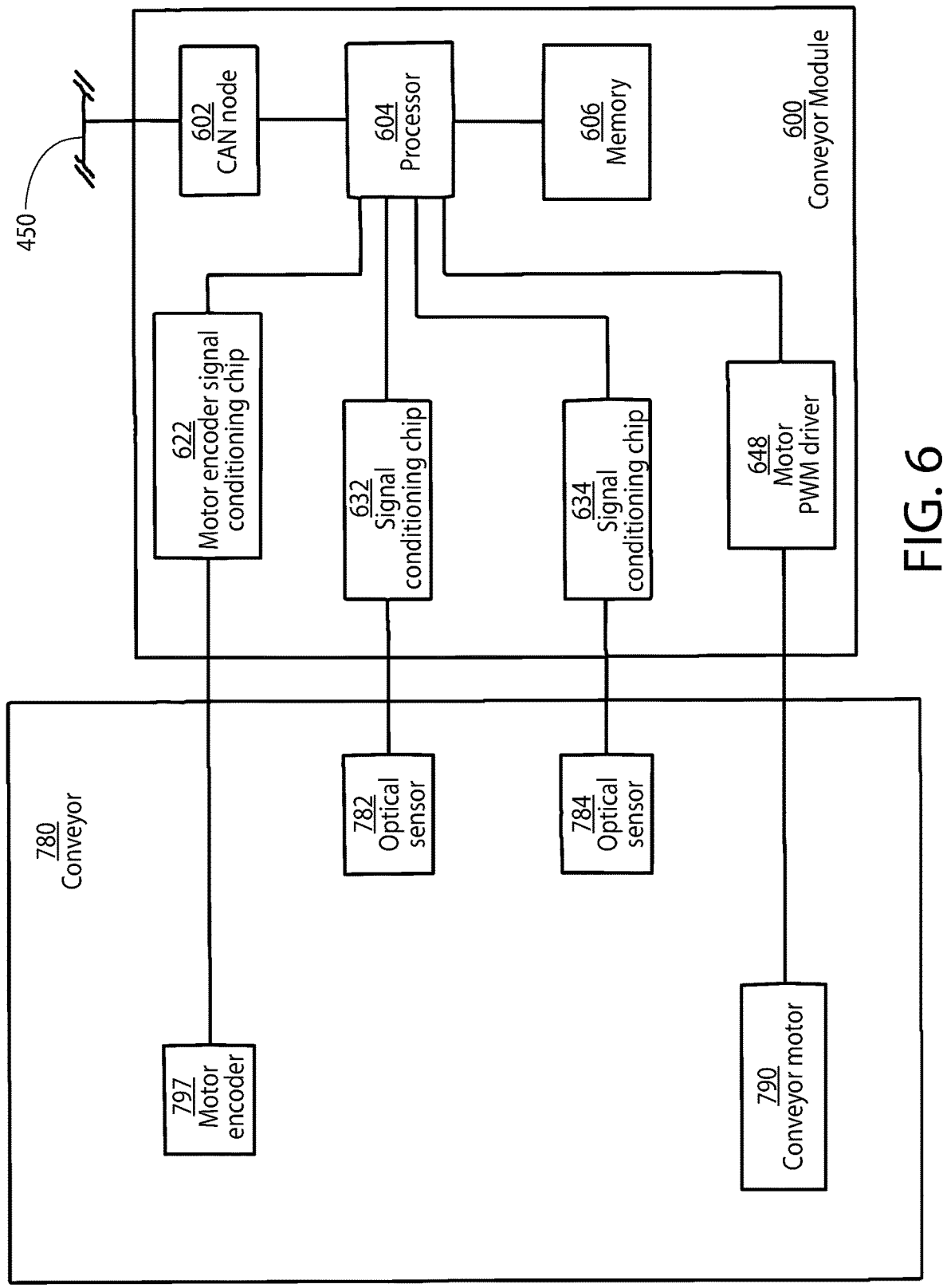
FIG. 6 schematically illustrates an example conveyor module.

FIG. 6 shows an example conveyor module 600. Conveyor module 600 may include a bus node 602 (e.g., a CAN node including a CAN transceiver, a controller, and a processor). The CAN node (e.g., the CAN transceiver) may be in electrical communication with the row bus 450. The conveyor module 600 may include a memory 606 and a processor 604 in electrical communication with a motor encoder signal conditioning chip 622, a motor PWM driver 648, and signal conditioning chips 632, 634. The motor PWM driver 648 is in electrical communication with a conveyor motor 790 mounted to a conveyor 780. The motor encoder signal conditioning chip 622 may be in electrical communication with a motor encoder 797 disposed to measure an operating speed of the conveyor motor 790. The signal conditioning chips 632, 634 may be in electrical communication with optical sensors 782, 784, respectively.

Figure 7B:
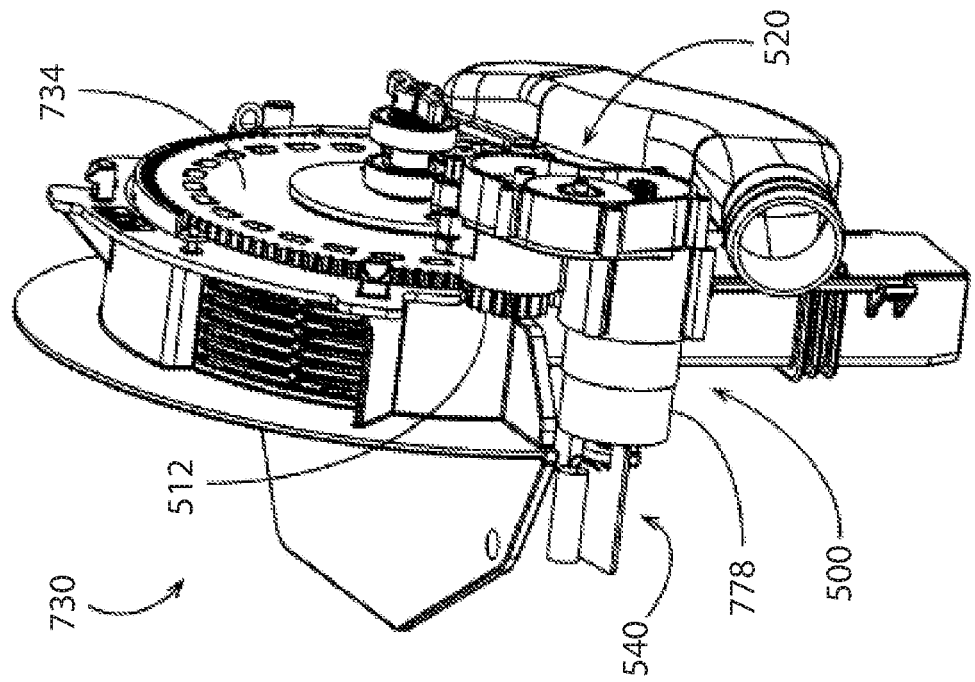
FIG. 7B is a perspective view of the example seed meter and drive module of FIG. 7A with covers removed.
Figure 7A:
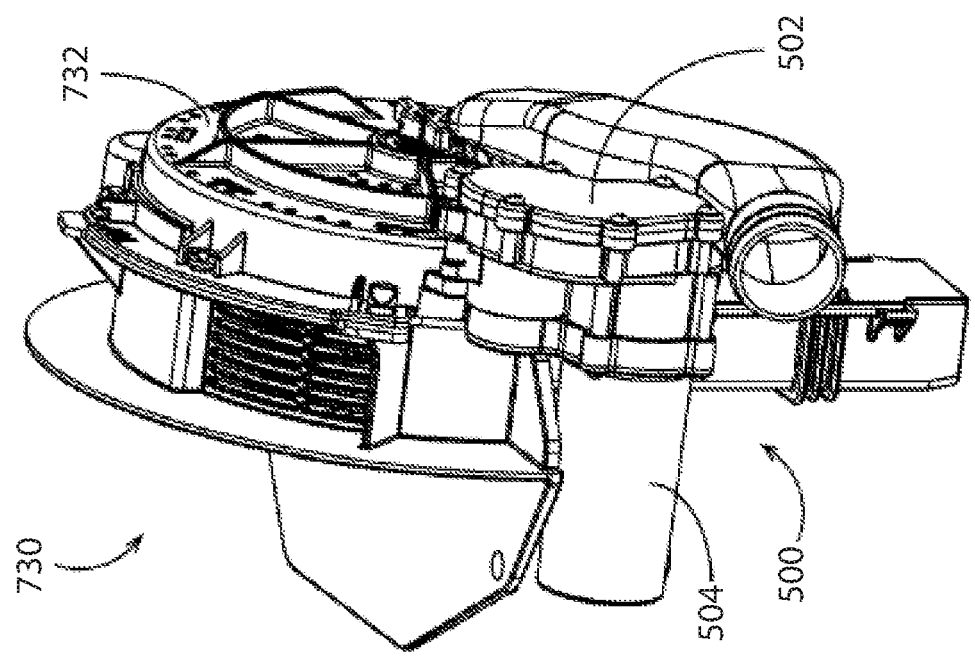
FIG. 7A is a perspective view of an example seed meter incorporating an example drive module.

As shown on FIGS. 7A and 7B, the drive module 500 may include an electrical assembly 540 and motor 778. The electrical assembly 540 and motor 778 may be shielded by a cover 504 and a gearbox 520 may be shielded by a cover 502. The drive module 500 may be mounted to a seed meter, such as seed meter 730. The seed meter may be of the type disclosed in Applicant's U.S. patent application Ser. No. 15/653,496, the disclosure of which is incorporated herein in its entirety by reference. For example, the drive module 500 may be mounted to a cover 732 shielding a seed disc 734 housed within the meter 730. The gearbox 520 may include an output gear 512 adapted to drive the seed disc 734, for example, by sequential engagement with gear teeth arranged circumferentially around a perimeter of the seed disc 734. The drive module 500 may be configured to identify and/or determine the disc velocity of the seed disc 734. For example, the drive module 500 may be configured to generate a signal indicative of the disc velocity of the seed disc 734.

An electronic device (such as monitor 310, or CPU 316) may be coupled to the seed disc 734, drive module 500, and/or seed sensor 708. Monitor 310 may be configured to determine a discharge time for one or more (e.g., each) discharged and/or planted seeds. For example, monitor 310 may be configured to determine a discharge time for one or more (e.g., each) discharged and/or planted seeds based on the light or electromagnetic waves sent across the path of seeds 242 via seed sensor 708. Monitor 310 may be configured to determine a seed disc index for one or more (e.g., each) discharged and/or planted seeds based on the signal indicative of the disc velocity of the seed disc 734, as described herein.

Figure 8B:
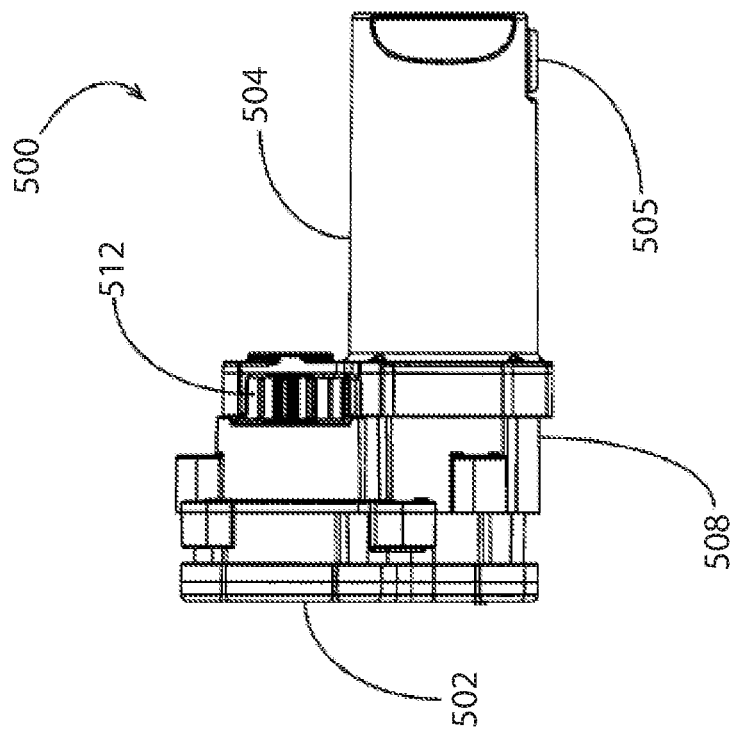
FIG. 8B is a side elevation view of the example drive module of FIG. 7A.
Figure 8A:
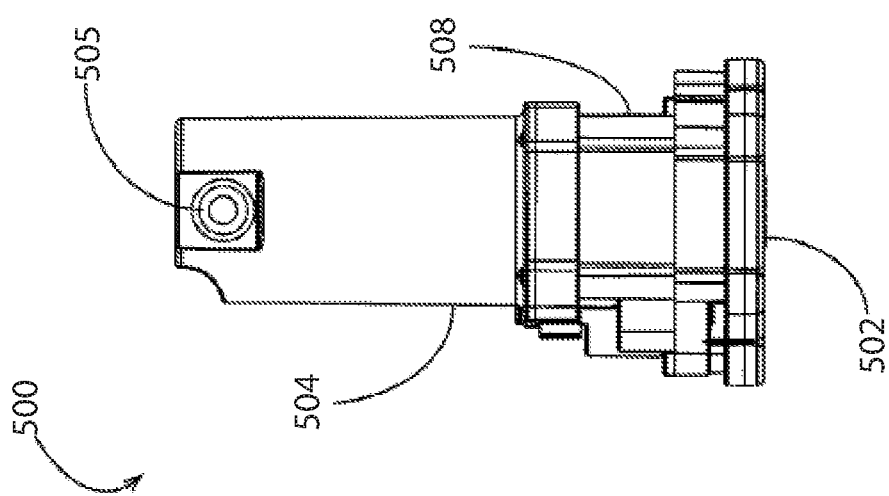
FIG. 8A is a bottom view of the example drive module of FIG. 7A.
Figure 10B:
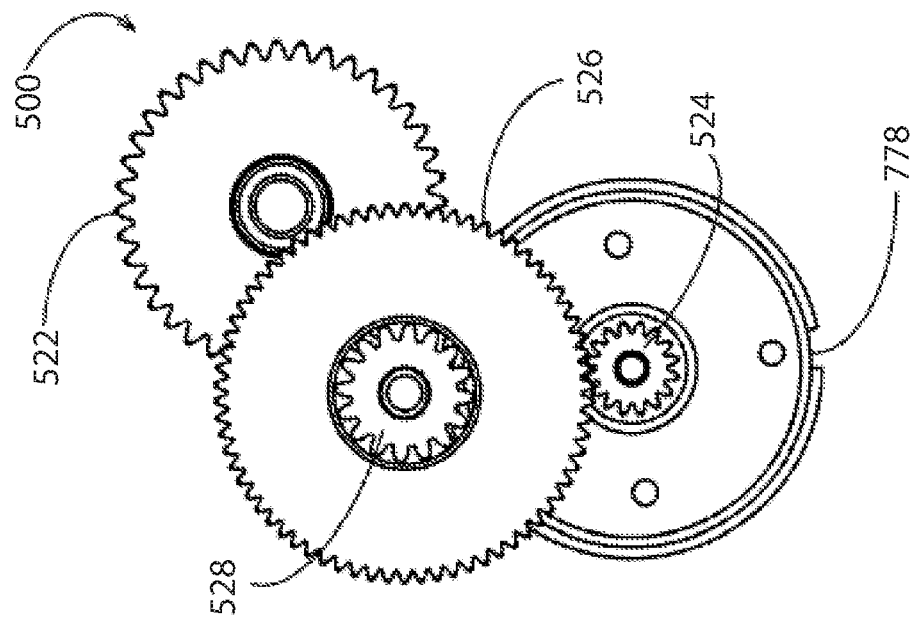
FIG. 10B is a rear view of the example drive module of FIG. 7A with covers and a housing removed for clarity.
Figure 10A:
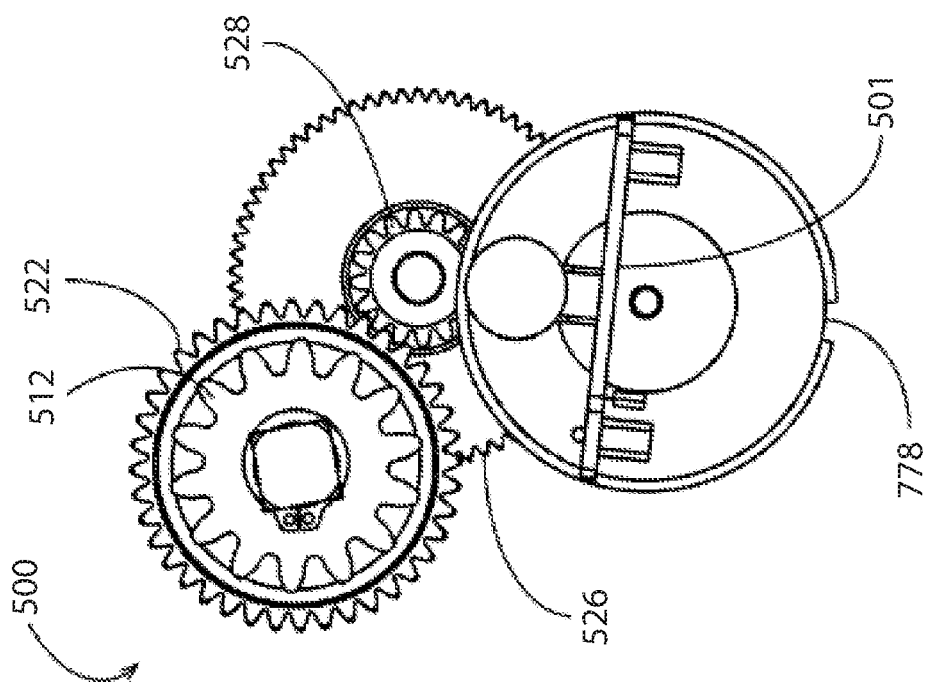
FIG. 10A is a front view of the example drive module of FIG. 7A with covers and a housing removed.
Figure 11:
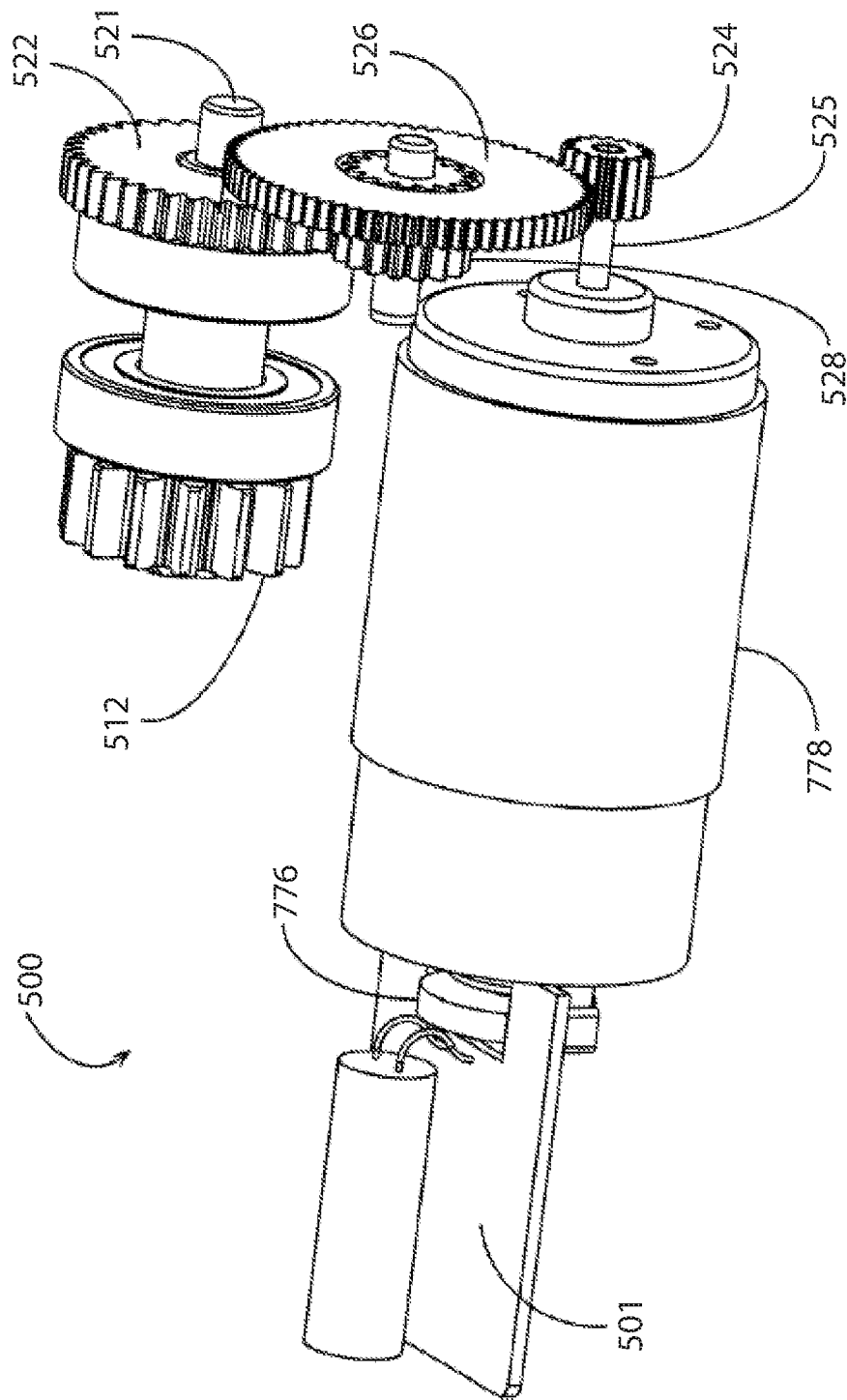
FIG. 11 is a perspective view of the example drive module of FIG. 7A with covers and a housing removed.

Turning to FIGS. 8A and 8B, the drive module 500 may include a housing 508 to which the covers 502, 504 may be mounted. The cover 502 may include rubber grommet 505 for introducing electrical leads into the cover 502.

As shown on FIGS. 9A, 9B, 10A, 10B, and 11, the gearbox 520 may include an input shaft 525 and input gear 524 that may be driven by the motor 778. The input gear may drive a first step-down gear 526 and/or a second step-down gear 528. The second step-down gear 528 may have a smaller diameter than the first step-down gear 526. The second step-down gear 528 may be mounted coaxially to the first step-down gear 526, e.g., by press fitting. The second step-down gear 528 may drive an intermediate gear 522. The intermediate gear 522 may drive the output gear 512, for example, via a shaft 521. The electrical assembly 540 may include the circuit board 501, the motor encoder 776 (e.g., including a magnetic encoder disc), and/or two leads 544a, 544b in electrical communication with the motor 778 for driving the motor.

Figure 12:
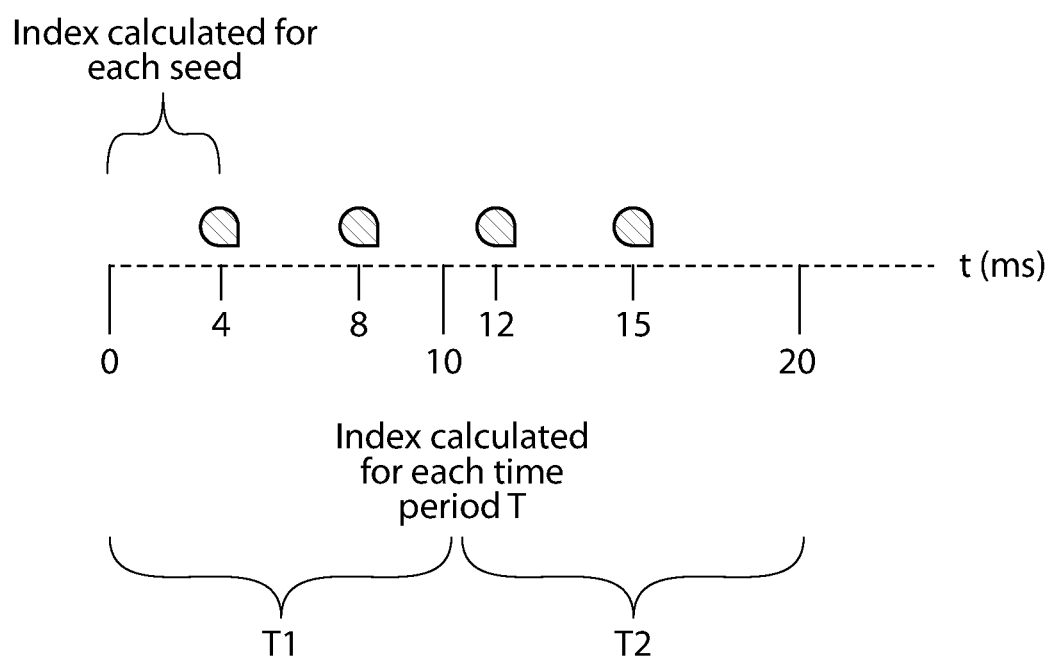
FIG. 12 illustrates an example timeline of seeds being discharged, in which an index may be determined for the discharged seeds.

FIG. 12 is an example timeline of discharged seeds. Based on the information relating to the discharge of the seeds, an index (e.g., a disc hole index or seed disc index) may be determined. For example, based on a disc velocity (e.g., of the seed disc) and one or more times (such as a time that a seed is discharged, a time at a beginning of a time period, etc.), an index may be determined. One or more indexes may be used to determine a spacing and/or a planting consistency of one or more seeds.

As described herein, seeds may be planted at a desired distance from one or more other seeds. For example, seeds planted too closely to one another may produce smaller plants due to competition for water and nutrients. Smaller plants may be undesirable as they may receive a reduced return. Alternatively, seeds planted too far from one another may result in a net loss due to unused soil (e.g., a plant not being seeded at available soil). Thus, planting seeds within a desired distance from one another may result in an optimal yield, which may result in a user (e.g., a farmer) receiving an optimal return on her planting of the seeds.

In an example, a desired (e.g., target or optimal) distance that seeds should be planted from one another may be 6.5 inches. In other words, for a farmer to receive the best return on her planting of the seeds, it may be desired that the seeds be planted 6.5 inches apart from one another. However, it may be improbable (or impossible) that all seeds be planted exactly within the desired seed distance. To allow for such deviations from a desired seed distance, there may be identified classifications of deviations from the desired planting distance. For example, there may be levels of seed distances classified as severely displaced, moderately displaced, non-displaced, etc.

For example, seeds may be considered severely misplaced if they are planted 3.5 inches (or greater) from the desired plant distance (e.g., 3.5 inches from the desired 6.5 inches). Seeds may be considered moderately misplaced if they are planted 1.5 inches (to 3.5 inches) from the desired plant distance (e.g., 1.5 inches to 3.5 inches from the desired 6.5 inches). Seeds may be considered non-displaced if they are planted less than 1.5 inches from the desired plant distance.

A distance and/or consistency of planted seeds may be determined. For example, if the desired distance between seeds is 6.5 inches, a consistency index may be used to determine how closely the seeds are planted within one another. As an example, if the desired planting distance is 6.5 inches, and a moderately displaced seed is planted 1.5 inches (to 3.5 inches) from another seed, a consistency index may be determined. The consistency index may be determined by first subtracting the distance of the moderately placed seed (e.g., 1.5 inches) from the desired seed distance (e.g., 6.5 inches), and then dividing that value with the desired seed distance. Using example values provided above, the consistency index may be approximately 0.77 holes (e.g. (6.5 inches-1.5 inches)/6.5 inches) for moderately spaced seeds.

In another example, the desired planting distance may be 6.5 inches, and a severely displaced seed may be planted 3.5 inches from another seed. The consistency index may be determined by first subtracting the value of the severely placed seed (e.g., 3.5 inches) from the desired seed distance (e.g., 6.5 inches), and then dividing that value with the desired seed distance. Using example values provided above, the consistency index may be approximately 0.46 holes (e.g. (6.5 inches-3.5 inches)/6.5 inches) for severely spaced seeds.

Using the above examples, if the difference in an index (e.g., a disc hole index or seed disc index, as described herein) between two planted seeds is less than 0.46 holes, then the seeds may be determined to be severely misplaced. If the difference in the index (e.g., a disc hole index) between two planted seeds is between 0.46 holes and 0.77 holes, the seeds may be determined to be moderately misplaced. If the difference in the index (e.g., a disc hole index) between two planted seeds is greater than 0.77 holes, than the seeds may be determined to not be misplaced, or to be misplaced within an acceptable degree.

As described herein, an index (e.g., a disc hole index) may be used to determine the planting consistency of a seed. The index may be calculated one or more times for one or more discharged (e.g., planted) seeds. The index may be calculated when a (e.g., each) seed is dispensed, for example, from a seed disc. In examples, the index may be calculated for one or more (e.g., each) predetermined time periods, such as the beginning of a time period, an ending of a time period, or an intermediate time period.

The determination of the index (e.g., disc hole index) may be better understood with reference to the example timeline provided on FIG. 12. FIG. 12 shows example time periods and times for which the index may be calculated.

FIG. 12 shows two time periods T (e.g., T1, T2), although in examples more (or less) time periods may be used. Each of the time periods are 10 ms in the example shown on FIG. 12, although a time period may be greater than 10 ms or less than 10 ms, such as 5 ms, 50 ms, 100 ms, etc. In examples, a time period may include the same amount of time as another time period (e.g., each time period may be 10 ms), although in examples a time period may include different amount of time from another time period (e.g., one time period may be 10 ms, and another time period may be 15 ms).

One or more seeds may be discharged (e.g., planted) at one or more times within a time period. The time at which the seed is discharged (e.g., planted) may be determined via a signal. For example, as described herein, a seed sensor (such as seed sensor 780) may be configured to generate a signal for one or more (e.g., each) of the discharged seeds, as described herein. As used herein, the term "signal" may refer to any detectable physical quantity or impulse (e.g., a voltage, current, magnetic field strength, etc.) by which information may be transmitted. For example, FIG. 12 shows two seeds being discharged (e.g., planted) within time period T1, such as at 4 ms and 8 ms. FIG. 12 shows two seeds being discharged (e.g., planted) within time period T2, such as at 12 ms and 15 ms.

In an example, the index (e.g., the disc hole index) may be determined at one or more (e.g., each) of the times in which a seed is discharged (e.g., planted). Using the example shown on FIG. 12, the index may be determined for one or more (e.g., each) of times 4 ms, 8 ms, 12 ms, and 15 ms. In other examples, the index (e.g., the disc hole index) may be determined at one or more other times, for example, times at which the seed is not discharged, such as the beginning of a time period (e.g., at time 10 ms), etc. In other examples, the index may not be determined at one or more (e.g., each) of the times in which a seed is discharged.

As described herein, seeds may be discharged via a seed disc (such as seed disc 734). The seed disc may be configured to rotate at a disc velocity. The seed disc may discharge seeds at different disc velocities, for example, based on a time period. For example, seed disc may discharge seeds at a disc velocity of 13 holes per second at T1, seed disc may discharge seeds at a disc velocity of 14 holes per second at T2, and/or seed disc may discharge seeds at the same or different disc velocity at one or more other time periods.

In an example in which the disc velocity is measured every 10 ms, as shown in FIG. 12, the disc velocity may be measured at 3 ms and 13 ms. In other examples the disc velocity may be measured at different beginning and ending times (e.g., at 5 ms and 15 ms, at 27 ms and 37 ms, at 167 ms and 177 ms, etc.). The seed disc may discharge seeds at a disc velocity within a time period that is the same as one or more other time periods or that is different than one or more other time periods. For example, the seed disc may discharge seeds at a disc velocity that is the same as one or more other time periods. The seed disc may discharge seeds at a disc velocity that is different than one or more other time periods. The disc velocity may be determined via a signal.

For example, a drive module (such as drive module 500) may be coupled to the seed disc and/or may be configured to generate a signal indicative of the disc velocity of the seed disc, as described herein.

The index may be a function of a disc velocity of the seed disc and one or more times. For example, the index may be a function of the disc velocity of the seed, a time at which a seed is discharged, and/or a time at which the time period has begun, as described herein. In such examples, at time 0 the disc hole index may be 0.

An example equation for determining an index (e.g., disc hole index or seed disc index) is shown in Equation (1), as follows:

$$I = I_T + (v_D)(t - t_T)$$ Equation (1):

where I is an index, $I_T$ is an index calculated at the beginning of a time period (e.g., a new time period), $v_D$ is a velocity of the seed disc (e.g., for the relevant time period), t is the time at which a seed is dispensed, and $t_T$ is a time at which the current period T began.

Referencing the example shown on FIG. 12, the first index determination may be made for the seed discharged at time 4 ms. As shown in FIG. 12, the beginning of the time period for time 4 ms is 0 ms. At time 0 ms, no index ($I_T$) has been calculated, so $I_T$ is zero for time 4 ms. At time 4 ms, because $I_T$ (the index calculated at the beginning of time period T1) is zero, $I_T$ of Equation (1) is equal to zero for 4 ms. Further, at time 4 ms, $t_T$ (the time at which T1 began) is zero. Because $t_T$ is zero for 4 ms, $t_T$ of Equation (1) is equal to zero for time 4 ms. Thus, for time 4 ms, because $I_T$ and $t_T$ are zeroed out, Equation (1) converts to Equation (2), as found below.

Therefore, the index for 4 ms (as well as the other times within time period T1) is calculated using Equation (2), as provided below:

$$I = (v_D)(t)$$ Equation (2):

where I is an index, $v_D$ is a velocity of the disc (e.g., for the relevant time period), and t is a time at which the seed is dispensed. As can be readily seen, Equation (2) is a variant of Equation (1) in which $I_T$ and $t_T$ are zeroed out.

Using Equation (2) for 4 ms, in an example in which the disc velocity ($v_D$) is 13 holes per second, I is 0.052 holes.

Again referencing FIG. 12, after time 4 ms the next seed discharge occurs at time 8 ms. Thus, the next index may be determined at time 8 ms. Because the values of $I_T$ and $t_T$ are zeroed out for time 8 ms, Equation (2) may be used to determine the index at time 8 ms. For 8 ms, in an example in which the disc velocity ($v_D$) is 13 holes per second, I is 0.104 holes.

As shown in FIG. 12, the next time period (e.g., T2) begins at time 10 ms. As time 10 ms is a new time period, an index may be determined. For example, the index may be determined at 10 ms to determine the $I_T$ value for time period T2. Time 10 ms may use the values of $I_T$, $t_T$, and/or $v_D$ from the previous time period, such as T1, although in some examples Time 10 ms may use the values of $I_T$, $t_T$, and/or $v_D$ from another time period, such as a current time period. Using the example in which the previous time period values are used, because the values of $I_T$ and $t_T$ are zeroed out for time period T1, Equation (2) may be used to determine the index at time 10 ms. For time 10 ms, the disc velocity may be 13 holes per second (for T1), although the disc velocity of other time periods (e.g., T2) may be used. In an example in which the disc velocity ($v_D$) is 13 holes per second for 10 ms, I is 0.13 holes.

In the example shown on FIG. 12, the next seed is discharged at time 12 ms. As can be seen on FIG. 12, time 12 occurs in the second time period (e.g., T2). Unlike time period T1, time period T2 may include non-zero values for $I_T$ and/or $t_T$, and the disc velocity may differ for the time periods. For example, for the second time period $v_D$ may be 14 holes per second. As provided herein, when the values of $I_T$ and/or $t_T$ are non-zero, Equation (1) may be used to determine the index. For time 12 ms, the value of $t_T$ may be 10 ms and/or the value for $I_T$, computed above for time 10 ms, may be 0.13 holes. Thus, using the example of time 12 ms in which $t_T$ is 10 ms, $I_T$ is 0.13 holes, and disc velocity $(v_D)$ is 14 holes per second, I is 0.158 holes.

Referencing FIG. 12, the next index determination may be made for the seed discharged at time 15 ms. Similar to time 12 ms, time 15 ms is within the second time period. As provided above, in the second time period $t_T$ is 10 ms, $I_T$ is 0.13 holes, and $v_D$ is 14 holes per second. Thus, similar to time 12 ms, the index calculation for time 15 ms will use Equation (1). Using Equation (1) the index I may be determined to be 0.2 holes for time 15 ms.

As described herein, indexes may be determined for one or more times at which seeds are discharged. Indexes may be determined for one or more time periods, or portions of a time period, such as the beginnings and/or endings of a time period. For example, the above determinations of indexes may be determined for additional time periods and discharged seeds.

Differences between indexes may be used to determine a planting consistency (e.g., spacing or distance between seeds) between discharged (e.g., planted) seeds. For example, if the first seed has an index of 12.6 holes, and the second seed has an index of 13.62 holes, the difference between the indexes is 1.02 holes. In another example, if the first seed has an index of 13.62 holes, and the second seed has an index of 14.04 holes, the difference between the indexes is 0.42 holes. The indexes of 1.02 holes and/or 0.042 holes may be used to determine the planting consistency (e.g., spacing or distance between seeds) of the seeds, as described herein. Using the example in which severely misplaced seeds are characterized as having a difference in indexes is less than 0.46 holes, the index of 0.42 holes may be determined to be severely misplaced.

In examples, a determination of whether a seed was (or was not) counted as a double may be used in the determination of whether seeds are severely misplaced, moderately misplaced, or not misplaced. For example, a seed may be determined to be severely misplaced if the difference in indexes between two seeds is less than 0.46 (and a seed was not already counted as a double). Similarly, a seed may be determined to be moderately misplaced if the difference in indexes between two seeds is less than 0.77 (and a seed was not counted as a double).

In an example, the user may enter spacing limits (e.g., in inches) into a display unit. The spacing limits may indicate the delta from the desired (e.g., target) distance between seeds that may be considered misplaced. To find misplaced seeds, the system may identify seed distances less than 5.0 inches (e.g., 6.5 inches-1.5 inches) for moderately misplaced seeds and 3.0 inches (e.g., 6.5 inches-3.5 inches) for severely misplaced seeds. The system may be configured to identify (e.g., only identify) short seed distances, for example, because a single misplaced seed may cause a short distance and a long distance, and the misplaced seed should be counted only once. As provided herein, the limits may be translated to 5.0 inches/6.5 inches=0.77 holes for moderately misplaced seeds, and 3.0 inches/6.5 inches=0.46 holes for severely misplaced seeds.

In some examples, planters may have more than one (e.g., two) meters dispensing seeds at the same time. For example, one meter may be in the process of turning off while another meter is in the process of turning on. In this example, the index determination provided herein may be used. In the example of more than one meter being used, the speeds of the more than one (e.g., two) discs may be added to calculate the disc velocity $v_D$.

The index (e.g., disc hole index or seed disc index) may be used for determining population, such as population of the planted seeds. For example, a running average of 500 index values may be used to create a long-view of population.

The index process described herein provides several advantages over prior methods of tracking planting consistency. For example, by considering the disc velocity for one or more (e.g., each) time period, the examples described herein allows the system to adapt to changing disc speeds. By considering speed changes between seeds, for example, the disclosed method accurately approximates the number of disc holes which have passed the ejection point of the meter. Such approximation allows population, SRI, singulation, and/or spacing to remain accurate, even under suboptimal conditions, such as when the dis is accelerating. Disc acceleration may occur, for example, at the start and/or end of a planting pass.

Figure 13:
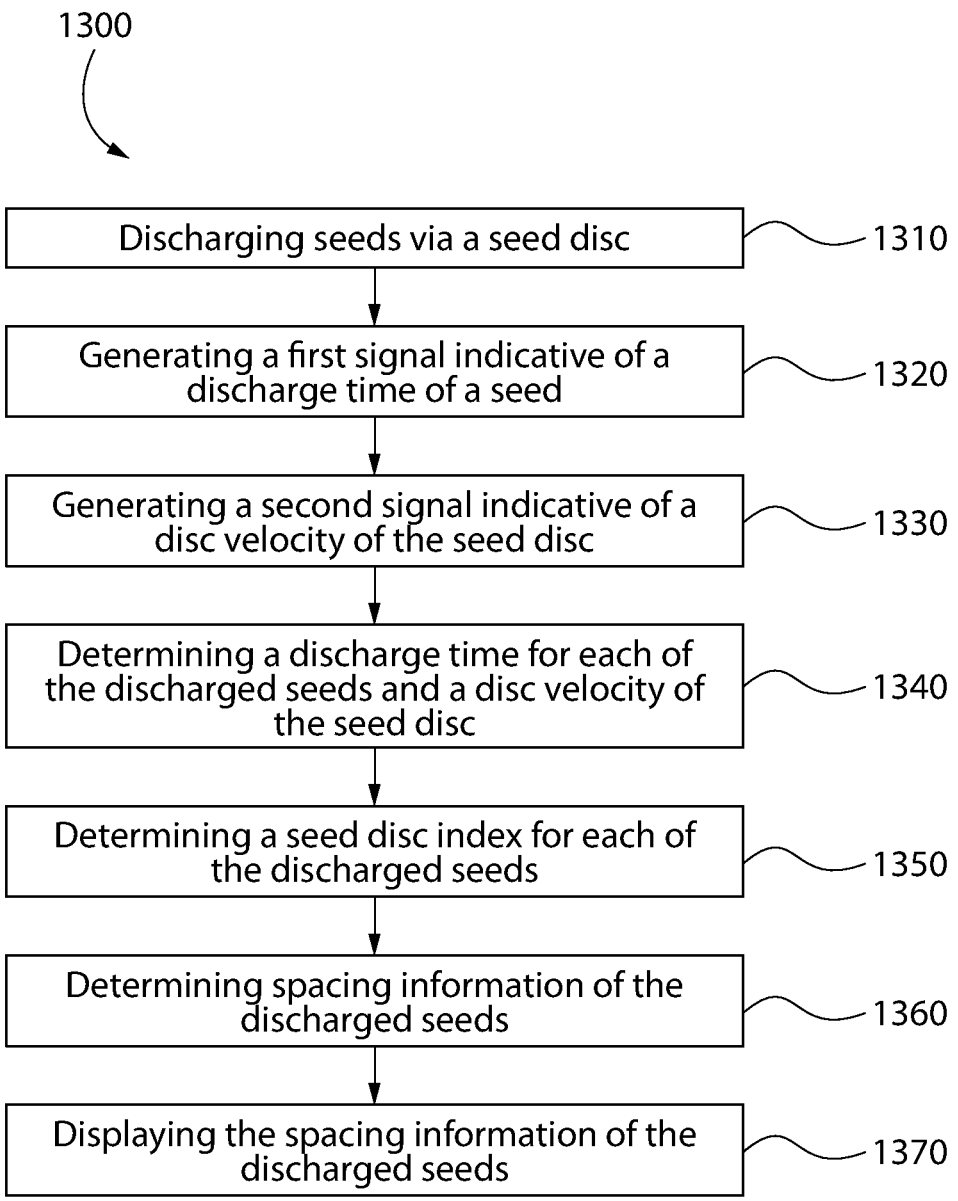
FIG. 13 illustrates an example process for determining a spacing of seeds.

FIG. 13 is an example process 1300 for determining spacing of seeds discharged from a planter, such as planter 100 (FIG. 1). As described herein, a seed disc (such as seed disc 734) may be configured to rotate at a disc velocity. At 1310, the seed disc may discharge one or more seeds. The seeds may be discharged during a time duration that may be divided into time periods of a predetermined duration. One or more (e.g., each) seed may have a relevant time period during which the seed was discharged.

At 1320, a first signal indicative of a discharge time of one or more of the seeds may be generated. A seed sensor (such as seed sensor 708) may be configured to generate the first signal indicative of a discharge time of one or more of the seeds. At 1330, a second signal indicative of a disc velocity (e.g., of the seed disc) may be generated. A drive module (such as drive module 500) may be operably coupled to the seed disc and may be configured to generate the second signal indicative of the disc velocity of the seed disc. The disc velocity may be a velocity determined during a relevant time period, for example, for a (e.g., each) determination of the seed disc index. At 1340, a discharge time for the discharged seeds may be determined and/or the disc velocity of the seed disc may be determined. The discharge time for the discharged seeds may be determined based on the first signal and/or the disc velocity of the seed disc may be determined based on the second signal.

At 1350, a seed disc index may be determined for one or more (e.g., each) of the discharged seeds. The seed disc index may be determined based on the disc velocity of the seed disc and the discharge time for the seed. The disc index (e.g., for each seed) may be based on a difference between the discharge time and a time at which the relevant time period for the seed began. The seed disc index (e.g., for each seed) may be determined by multiplying the disc velocity determined during the relevant time period by the difference between the discharge time and the time at which the relevant time period for the seed began. The seed disc index (e.g., for each seed) may be based on a seed disc index determined at the time at which the relevant time period for the seed began.

At 1360, spacing information may be determined for the seeds. Spacing information may be determined by comparing the determined seed disc indexes. For example, spacing information may be determined based on differences between the determined seed disc index for one or more (e.g., each) seed. The spacing information may be indicative of whether the seeds are moderately misplaced from one another or severely misplaced from one another. A plant population of an area may be based on the spacing information of the seeds.

At 1370, information may be displayed, for example, via monitor 150. Index information and/or spacing information may be displayed. For example, index information and/or spacing information may be displayed via monitor 150.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

I claim:

1. A monitoring system for an agricultural seed planter, the monitoring system comprising:
   a seed disc configured to rotate at a disc velocity to discharge seeds;
   a seed sensor configured to generate for each seed of the discharged seeds a first signal indicative of a discharge time of the seed;
   a drive module operably coupled to the seed disc and configured to generate a second signal indicative of the disc velocity of the seed disc;
   processing circuitry operably coupled to the seed sensor and the seed disc sensor, the processing circuitry configured to:
      determine the discharge time for each seed of the discharge seeds based on the first signal and the disc velocity of the seed disc based on the second signal;
      determine a seed disc index for each seed of the discharged seeds based on the disc velocity of the seed disc and the discharge time for the seed; and
      determine spacing information for the seeds by comparing the determined seed disc indexes; and
   a visual display operably coupled to the processing circuitry, the visual display configured to display the spacing information of the seeds.

2. The monitoring system of claim 1 wherein the spacing information is determined based on differences between the determined seed disc index for each seed.

3. The monitoring system of claim 1:
   wherein the seeds are discharged during a time duration that is divided into time periods of a predetermined duration, each seed having a relevant time period during which the seed was discharged; and
   wherein for each seed, the disc index is based on a difference between the discharge time and a time at which the relevant time period for the seed began.

4. The monitoring system of claim 3 wherein for each determination of the seed disc index, the disc velocity is a velocity determined during the relevant time period.

5. The monitoring system of claim 4 wherein the seed disc index for each seed is determined in part by multiplying the disc velocity determined during the relevant time period by the difference between the discharge time and the time at which the relevant time period for the seed began.

6. The monitoring system of claim 5 wherein the seed disc index for each seed is further based on a seed disc index determined at the time at which the relevant time period for the seed began.

7. The monitoring system of claim 1 wherein the spacing information is indicative of whether the seeds are moderately misplaced from one another or severely misplaced from one another.

8. The monitoring system of claim 1 wherein the processing circuitry is configured to determine a plant population of an area based on the spacing information of the seeds.

9. The monitoring system of claim 1 wherein the drive module is operably coupled to the seed disc via a gear adapted to drive the seed disc.

10. The monitoring system of claim 9 wherein the gear is adapted to drive the seed disc by sequential engagement with gear teeth arranged circumferentially around a perimeter of the seed disc.

11. The monitoring system of claim 1 wherein the second signal comprises encoder pulses from a motor encoder of the drive module, the processing circuitry determining the disc velocity of the seed disc based on times between the encoder pulses.

12. A method for monitoring seed spacing for an agricultural seed planter, the method comprising:
   rotating a seed disc at a disc velocity to discharge seeds;
   determining, by a seed sensor, a discharge time for each seed of the discharged seeds;
   determining the disc velocity of the seed disc;
   determining a seed disc index for each seed of the discharged seeds based on the disc velocity of the seed disc and the discharge time for the seed;
   determining spacing information for the seeds by comparing the determined seed disc indexes; and
   displaying the spacing information of the seeds.

13. The method of claim 12 wherein the spacing information is determined based on differences between the determined seed disc index for each seed.

14. The method of claim 12:
   wherein the seeds are discharged during a time duration that is divided into time periods of a predetermined duration, each seed having a relevant time period during which the seed was discharged; and
   wherein for each seed, the disc index is based on a difference between the discharge time and a time at which the relevant time period for the seed began.

15. The method of claim 14 wherein for each determination of the seed disc index, the disc velocity is a velocity determined during the relevant time period.

16. The method of claim 15 wherein the seed disc index for each seed is determined in part by multiplying the disc velocity determined during the relevant time period by the difference between the discharge time of the seed and the time at which the relevant time period for the seed began.

17. The method of claim 16 wherein the seed disc index for each seed is further based on a seed disc index determined at the time at which the relevant time period for the seed began.

18. The method of claim 12, wherein the disc velocity of the seed disc is determined based on times between encoder pulses from a motor encoder of a drive module.

19. A monitoring device for an agricultural seed planter, the monitoring device comprising:

processing circuitry configured to operably couple to a seed sensor and a drive motor of a planter, the planter comprising a seed disc configured to rotate at a disc velocity to discharge seeds, the seed sensor configured to generate for each seed of the discharged seeds a first signal indicative of a discharge time for the seed, and the drive motor configured to generate a second signal indicative of the disc velocity of the seed disc;

the processing circuitry configured to:
determine the discharge time for each seed of the discharge seeds based on the first signal and the disc velocity of the seed disc based on the second signal;
determine a seed disc index for each seed of the discharged seeds based on the disc velocity of the seed disc and the discharge time for the seed; and
determine spacing information for the seeds by comparing the determined seed disc indexes; and a visual display operably coupled to the processing circuitry, the visual display configured to display the spacing information of the seeds.

20. The monitoring device of claim 19 wherein the spacing information is determined based on differences between the determined seed disc index for each seed.

21. The monitoring device of claim 19:
wherein the seeds are discharged during a time duration that is divided into time periods of a predetermined duration, each seed having a relevant time period during which the seed was discharged; and
wherein for each seed, the disc index is based on a difference between the discharge time of the seed and a time at which the relevant time period for the seed began.

22. The monitoring device of claim 21 wherein for each determination of the seed disc index, the disc velocity is a velocity determined during the relevant time period.

23. The monitoring device of claim 22 wherein the seed disc index for each seed is determined in part by multiplying the disc velocity at the time at which the relevant time period began by the difference between the discharge time of the seed and the time at which the relevant time period for the seed began.

24. The monitoring device of claim 23 wherein the seed disc index for each seed is further based on a seed disc index determined at the time at which the relevant time period for the seed began.

25. The monitoring device of claim 19 wherein the drive module is operably coupled to the seed disc via a gear adapted to drive the seed disc.

26. The monitoring device of claim 25 wherein the gear is adapted to drive the seed disc by sequential engagement with gear teeth arranged circumferentially around a perimeter of the seed disc.

27. The monitoring device of claim 19 wherein the second signal comprises encoder pulses from a motor encoder of the drive module, the processing circuitry determining the disc velocity of the seed disc based on times between the encoder pulses.

* * * * *